(12) United States Patent
Cheremshynski et al.

(10) Patent No.: US 6,827,103 B2
(45) Date of Patent: Dec. 7, 2004

(54) AUTOMATIC EAVES TROUGH DOWNSPOUT

(75) Inventors: David L. Cheremshynski, 6116-154 Avenue, Edmonton, Alberta (CA), T5Y 2M8; Carlo D'Elia, St. Albert (CA); Michael Clarence Claerhout, Beaumont (CA)

(73) Assignee: David L. Cheremshynski, Edmonton (CA)

( * ) Notice: Subject to any disclaimer, the term of this patent is extended or adjusted under 35 U.S.C. 154(b) by 0 days.

(21) Appl. No.: 10/447,861

(22) Filed: May 28, 2003

(65) Prior Publication Data

US 2004/0035473 A1 Feb. 26, 2004

(30) Foreign Application Priority Data

Aug. 22, 2002 (CA) ............................................. 2399392

(51) Int. Cl.[7] ................................................. F16L 27/00
(52) U.S. Cl. ........................................... 137/615; 52/16
(58) Field of Search ............................... 137/615; 52/16

(56) References Cited

U.S. PATENT DOCUMENTS

| | | | | |
|---|---|---|---|---|
| 2,739,778 A | * | 3/1956 | Krone et al. ................ | 137/615 |
| 3,091,055 A | * | 5/1963 | Hegedusich .................... | 52/16 |
| 3,375,851 A | * | 4/1968 | Henry et al. ................. | 137/615 |
| 3,911,954 A | * | 10/1975 | Johnson ....................... | 137/615 |
| 5,435,051 A | * | 7/1995 | Cheremshynski .............. | 52/16 |
| 5,482,084 A | * | 1/1996 | Cassidy et al. ............. | 137/615 |
| 5,522,427 A | * | 6/1996 | Johnson ................... | 137/616.5 |

* cited by examiner

Primary Examiner—Kevin Lee
(74) Attorney, Agent, or Firm—Christensen O'Connor Johnson Kindness PLLC

(57) ABSTRACT

An automatic eaves trough downspout includes a first conduit and a second conduit. The first conduit has a coupling socket. The second conduit has a hollow cylindrical coupling body is adapted to fit in the socket to form a pivotal connection. A pair of pivot pins serve as an axle for relative pivotal movement of the first conduit and the second conduit. A torsion spring overlies at least one of the pivot pins to bias the second conduit into a substantially vertical stored position. A ratchet engagement is provided between the pivot pin and the socket of the first conduit, which permits rotational movement pin in the first direction to increase spring tension and resists rotational movement in the second direction.

3 Claims, 4 Drawing Sheets

AUTOMATIC EAVES TROUGH DOWNSPOUT

FIELD OF THE INVENTION

The present invention relates to an automatic eaves trough downspout.

BACKGROUND OF THE INVENTION

U.S. Pat. Nos. 5,482,084 (Cassidy et al 1996) and 5,522,427 (Johnson 1996), disclose automatic eaves trough downspouts. Each device has a downspout which remains out of the way in a substantially vertical stored position when it is not raining. When it rains, water accumulates in the downspout until the weight of the water causes it to descend to a substantially horizontal discharge position. Once the rain water has been discharged, a biasing force exerted by a spring causes the downspout to return to the substantially vertical stored position. Overtime, the downspout will descend numerous times from the substantially vertical stored position to the substantially horizontal discharge position as water accumulates and then return to the substantially vertical stored position due to the biasing force of the spring.

During initial installation spring tension must be set, based upon the length and weight of the drainpipe carried by the mechanism. Over time the spring becomes worn and spring tension must be adjusted in order to maintain the proper operation of the automatic eaves downspout. The Cassidy reference discloses what is referred to as a "spring tension gauge" that consists of a threaded bolt connected to a linear coil spring that can be engaged to varying degrees with a threaded attachment aperture to exert an axial force upon the spring and thereby increase spring tension. The Johnson reference discloses embodiments which use two different types of springs, a helical spring and a tension spring. In each case a number of holes provide alternative attachment positions. Spring tension is adjusted by selecting the attachment position which provides the desired spring tension.

SUMMARY OF THE INVENTION

What is required is an automatic eaves trough downspout having an alternative manner of adjusting spring tension.

According to the present invention there is provided an automatic eaves trough downspout which includes a first conduit having a coupling socket. A second conduit is provided having a hollow cylindrical coupling body which is adapted to fit in the socket to form a pivotal connection that enables the second conduit to move between a substantially vertical stored position parallel to the first conduit and a substantially horizontal discharge position. The cylindrical coupling body has opposed ends with hubs that have axle receiving openings and a first torsion spring attachment position. A pair of pivot pins are provided which each have a head portion and an axle portion. The axle portion extends from the coupling socket into the axle receiving openings of the cylindrical coupling body. Each of the pivot pins have a second torsion spring attachment position. At least one torsion spring is provided that has a first end and a second end and overlies one of the pivot pins. The first of the torsion spring is secured in the first torsion spring attachment position and the second end of the torsion spring is secured in the second spring attachment position, such that rotation of the pivot pin in a first direction increases the tension of the at least one torsion spring and rotation of the pivot pin in a second direction decreases the tension of the at least one torsion spring. The torsion spring biases the second conduit into the substantially vertical stored position. A ratchet engagement is provided between the head portion of the pivot pin and the socket of the first conduit. The ratchet engagement permits rotational movement of the pivot pin in the first direction to increase spring tension and resists rotational movement in the second direction.

With the automatic eaves downspout, as described above, spring tension is adjusted as the spring wears by merely rotating the pivot pin to increase the spring tension, as required.

Although beneficial results may be obtained through use of the automatic eaves trough downspout, as described above, even more beneficial results may be obtained through the use of dual torsion springs. A first torsion spring overlies a first of the pair of pivot pins and a second torsion spring overlies a second of the pair of pivot pins, thereby enabling either or both of pivot pins to be rotated to adjust the spring tension.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
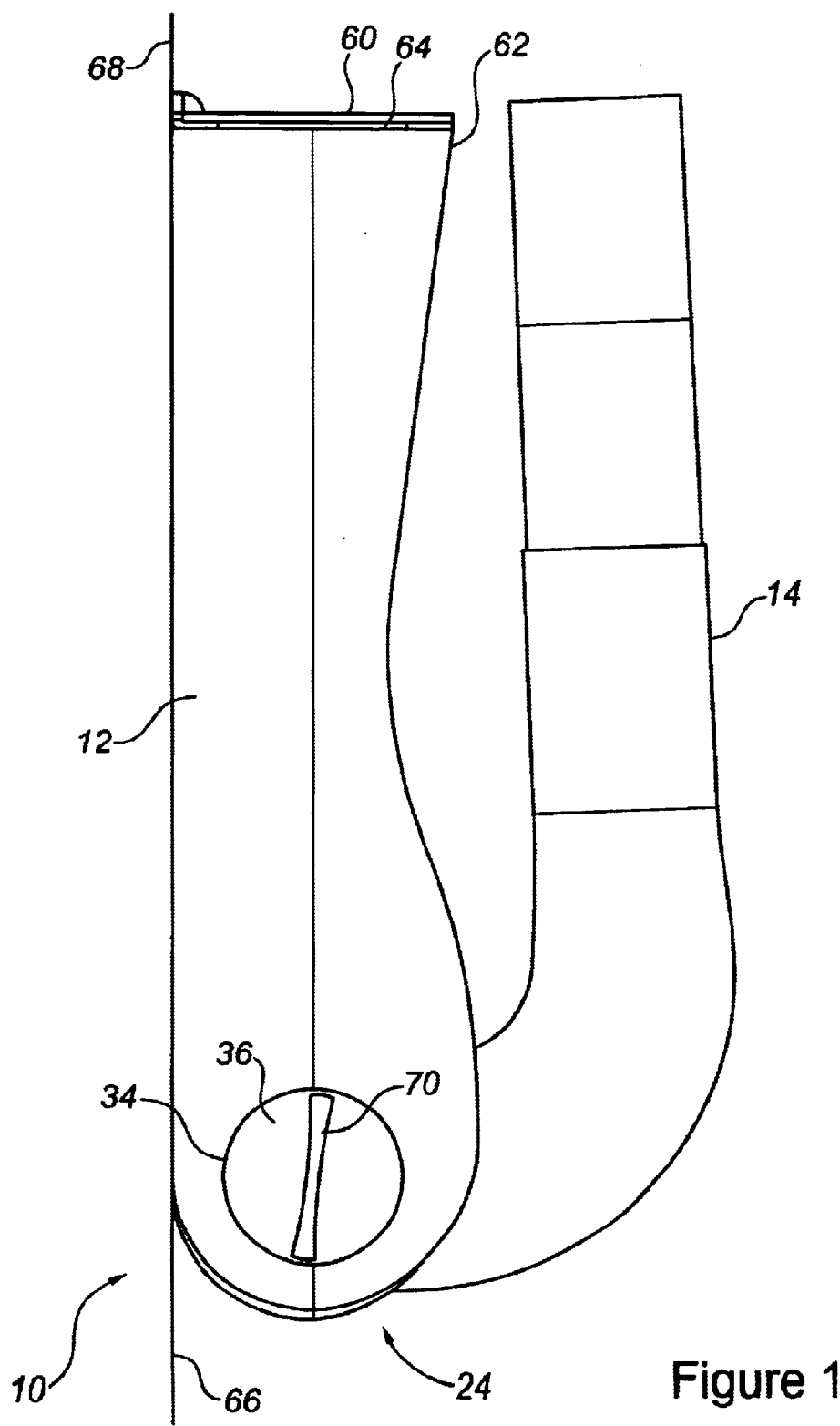
FIG. 1 is a side elevation view of an automatic eaves trough downspout constructed in accordance with the teachings of the present invention, with the second conduit in a substantially vertical stored position.

The preferred embodiment, an automatic eaves trough downspout 10 generally identified by reference numeral 10, will now be described with reference to FIGS. 1 through 4.

Figure 2:
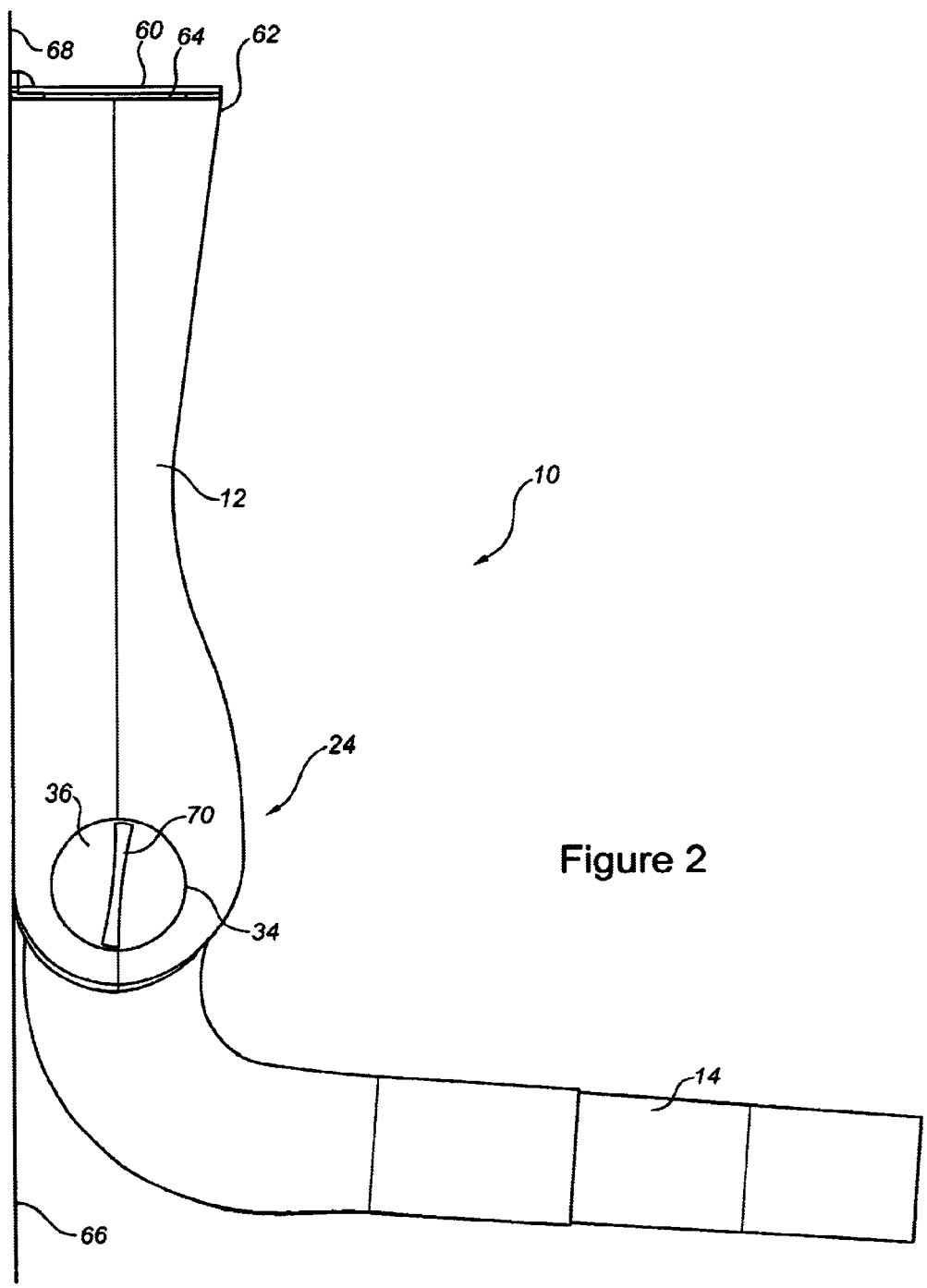
FIG. 2 is a side elevation view of the automatic eaves trough downspout illustrated in FIG. 1, with the second conduit in a substantially horizontal discharge position
Figure 3:
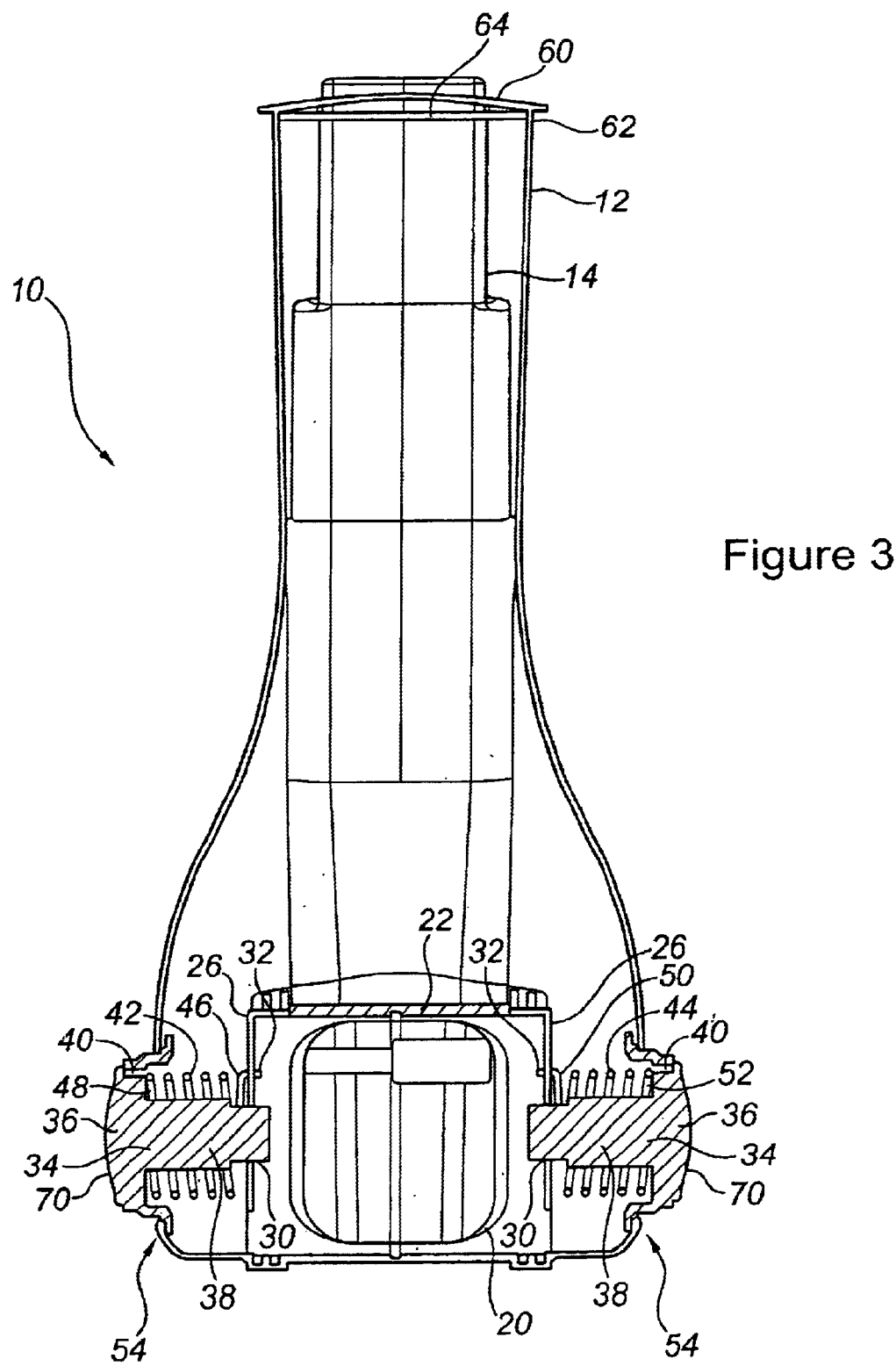
FIG. 3 is a front elevation view, in section, of the automatic eaves trough downspout illustrated in FIG. 1.
Figure 4:
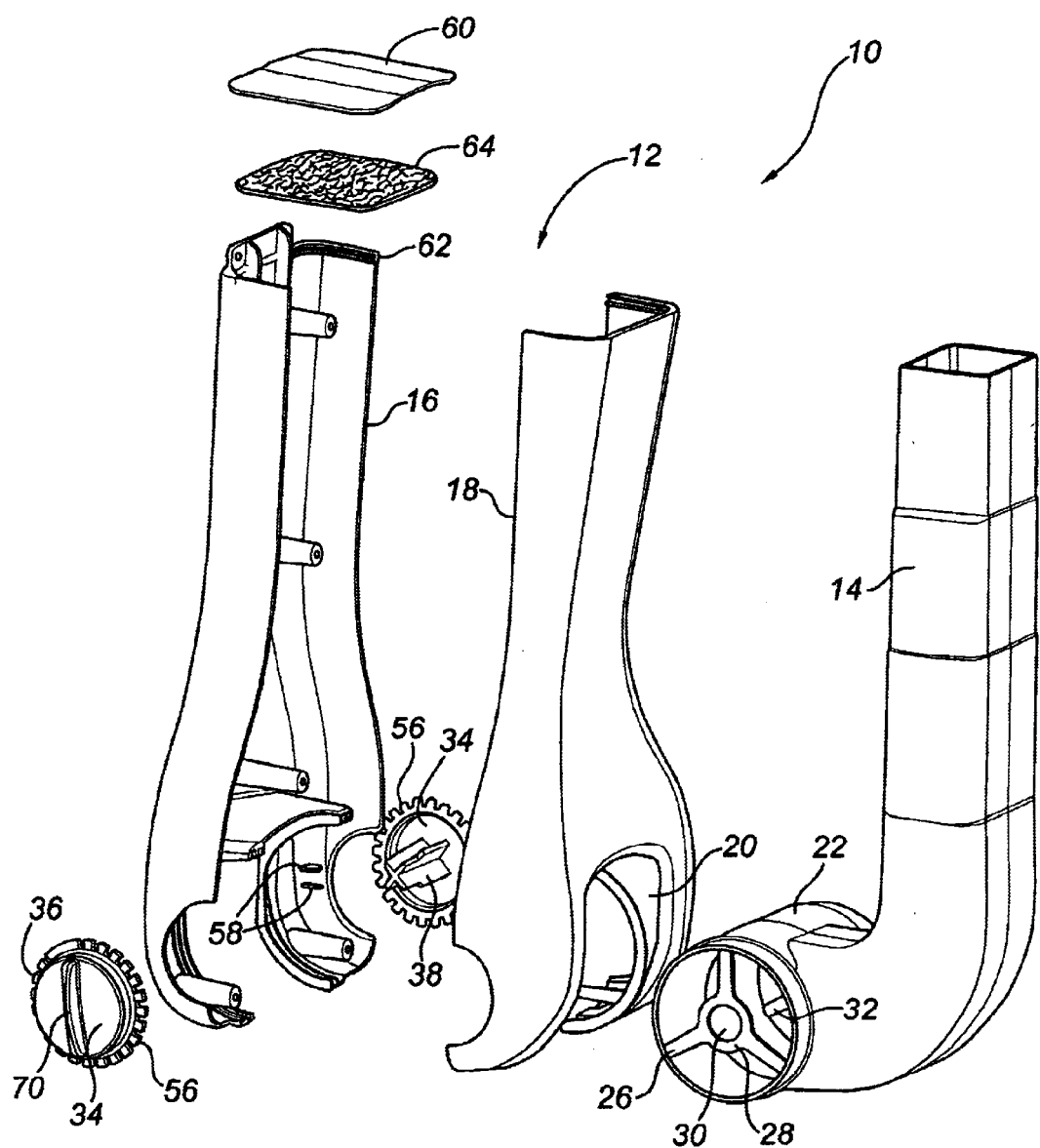
FIG. 4 is an exploded perspective view of the automatic eaves trough downspout illustrated in FIG. 1.

Structure and Relationship of Parts:

Referring to FIG. 1, there is provided an automatic eaves trough downspout 10 which includes a first conduit 12 and a second conduit 14. Referring to FIG. 4, for ease of assembly, first conduit 12 is assembled from two halves, a first half 16 and a second half 18 although it will be appreciated that there are other ways that first conduit 12 could be configured. Referring to FIG. 3, first conduit 12 has a coupling socket 20. Referring to FIG. 4, second conduit 14 has a hollow cylindrical coupling body 22 that is adapted to fit in socket 20 of first conduit 12 to form a pivotal connection generally referenced by numeral 24 in FIG. 1. Pivotal connection 24 enables second conduit 14 to move between a substantially vertical stored position parallel to first conduit 12 as illustrated in FIG. 1, and a substantially horizontal discharge position as illustrated in FIG. 2.

Referring to FIG. 3, cylindrical coupling body 22 has opposed ends 26. Referring to FIG. 4, each of opposed ends 26 have hubs 28 with axle receiving openings 30 and a first torsion spring attachment position 32. Referring to FIG. 3, a pair of pivot pins 34 are provided which each have a head portion 36 and an axle portion 38. Axle portion 38 extends from coupling socket 20 into axle receiving openings 30 of cylindrical coupling body 22. Each of pivot pins 34 has a second torsion spring attachment position 40.

A first torsion spring 42 overlies a first of pair of pivot pins 34 and a second torsion spring 44 overlies a second of pair of pivot pins 34. First torsion spring 42 has a first end 46 and a second end 48. Second torsion spring 44 has a first end 50 and a second end 52. First end 46 of first torsion spring 42 and first end 50 of second torsion spring 44 are secured in first torsion spring attachment position 32 while second end 48 of first torsion spring 42 and second end 52 of second torsion spring 44 are secured in second spring attachment position 40. Rotation of pivot pins 34 in a first direction increases the tension of first torsion spring 42 and second torsion spring 44 and rotation of pivot pins 34 in a second direction decreases the tension of first torsion spring 42 and second torsion spring 44. First torsion spring 42 and second torsion spring 44 bias second conduit 14 into the substantially vertical stored position illustrated in FIG. 1.

Referring to FIG. 3, a ratchet engagement, generally referenced by numeral 54, is provided between head portions 36 of each of pivot pins 34 and socket 20 of first conduit 12. Ratchet engagement 54 permits rotational movement of pivot pins 34 in the first direction to increase spring tension and resist rotational movement in the second direction. Referring to FIG. 4, ratchet mechanism 54 includes a plurality of engagement members 56 which extend radially from a circumference of head portion 36 of each of pivot pins 34. Engagement member receiving posts 58 are provided on first conduit 12 that are adapted to receive engagement members 56 for the purpose of maintaining pivot pin 34 in position to resist rotational movement.

Referring to FIG. 3, a cover 60 is provided at an upper end 62 of first conduit 12. Referring to FIG. 4, a filtering screen 64 is disposed between cover 60 and upper end 62 of first conduit 12.

Operation:

The use an operation automatic eaves trough downspout 10 generally identified by reference numeral 10, will now be described with reference to FIGS. 1 through 4.

Referring to FIG. 1, automatic eaves trough downspout 10 can be mounted to an exterior wall 66 of a structure 68 in order to collect accumulating rainwater and then discharge the rainwater at a distance from exterior wall 66. When it is not raining, automatic eaves trough downspout 10 remains out of the way with first torsion spring 42 and second torsion spring 44 illustrated in FIG. 3, biasing second conduit 14 into the substantially vertical stored position parallel to first conduit 12 as illustrated in FIG. 1. Referring to FIG. 2, when it rains, water accumulates in second conduit 14 of automatic eaves trough downspout 10 until the weight of the water overcomes the biasing force of first torsion spring 42 and second torsion spring 44 illustrated in FIG. 3, such that second conduit 14 descends to the substantially horizontal discharge position. Referring to FIG. 1, once the rain water has been discharged from second conduit 14, the biasing force exerted by first torsion spring 42 and second torsion spring 44 illustrated in FIG. 3, causes second conduit 14 to return to the substantially vertical stored position. Referring to FIG. 2, over a season, second conduit 14 will descend numerous times from the substantially vertical stored position illustrated in FIG. 1, to the substantially horizontal discharge position FIG. 2, and then return to the substantially vertical stored position again as illustrated in FIG. 1 due to the biasing force of first torsion spring 42 and second torsion spring 44 illustrated in FIG. 3.

Referring to FIG. 3, over time, first torsion spring 42 and second torsion spring 44 tend to become worn and spring tension must be adjusted in order to maintain the proper operation of automatic eaves downspout 10. Referring to FIG. 4, in order to do so, pivot pins 34 have finger grips 70 which extend outwardly from head portion 36 of each pivot pin 34. Referring to FIG. 3, finger grips 70 allow for pivot pins 34 to be rotated to adjust the spring tension of first torsion spring 42 and second torsion spring 44. Using finger grips 70, pivot pins 34 are pushed in slightly to disengage engagement members 56 of ratchet engagement 54 from engagement member receiving posts 58 so as to permit rotational movement of pivot pins 34 in a first direction to increase spring tension. After rotation of pivot pins 34, engagement members 56 are slotted into engagement member receiving posts 58 such that pivot pin 34 resist rotational movement in a second direction which would otherwise reduce spring tension.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An automatic eaves trough downspout, comprising:

a first conduit having a coupling socket;

a second conduit having a hollow cylindrical coupling body which is adapted to fit in the socket to form a pivotal connection that enables the second conduit to move between a substantially vertical stored position parallel to the first conduit and a substantially horizontal discharge position, the cylindrical coupling body having opposed ends with hubs having axle receiving openings and a first torsion spring attachment position;

a pair of pivot pins each having a head portion and an axle portion, the axle portion extending from the coupling socket into the axle receiving openings of the cylindrical coupling body, each of the pivot pins having a second torsion spring attachment position;

at least one torsion spring having a first end and a second end and overlying one of the pivot pins, the first end of the at least one torsion spring being secured in the first torsion spring attachment position and the second end of the at least one torsion spring being secured in the second spring attachment position, such that rotation of the pivot pin in a first direction increases the tension of the at least one torsion spring and rotation of the pivot pin in a second direction decreases the tension of the at least one torsion spring, the torsion spring biasing the second conduit into the substantially vertical stored position; and a ratchet engagement between the head portion of the pivot pin and the socket of the first conduit, the ratchet engagement permitting rotational movement of the pivot pin in the first direction to increase spring tension and resisting rotational movement in the second direction.

2. The automatic eaves trough downspout as defined in claim 1, wherein a first torsion spring overlies a first of the pair of pivot pins and a second torsion spring overlies a second of the pair of pivot pins.

3. The automatic eaves trough downspout as defined in claim 1, wherein the ratchet mechanism includes a plurality of engagement members extending radially from a circumference of the head portion of one of the pivot pins which are adapted to engage engagement member receiving posts on the first conduit to resist rotational movement, the pivot pins being capable of limited axial movement to move the engagement members away from the engagement member receiving posts, such that when an axial force is exerted upon the one of the pivot pins the engagement members are disengaged from the engagement member receiving posts so as to permit rotational movement of the one of the pivot pins in a first direction to increase tension on the at least one torsion spring, after rotation of the one of the pivot pins and the axial force is released, the engagement members are re-engaged with the engagement member receiving posts.

* * * * *